United States Patent [19]

Wirschal et al.

[11] 4,394,098
[45] Jul. 19, 1983

[54] RADIAL GATE HAVING FINE TUNING OF FLOW CONTROL

[75] Inventors: Helmut H. Wirschal, York; Warren G. Whippen, Dover, both of Pa.

[73] Assignee: Allis-Chalmers Corporation, Milwaukee, Wis.

[21] Appl. No.: 203,537

[22] Filed: Nov. 3, 1980

[51] Int. Cl.³ .......................... E02B 9/08; F03B 15/04
[52] U.S. Cl. ...................................... 405/77; 405/87; 405/100; 415/151; 290/52
[58] Field of Search ...................... 415/147, 148, 151; 405/75, 80, 77, 86, 87, 92, 94, 99, 100, 106; 290/52

[56] References Cited

U.S. PATENT DOCUMENTS 782,390  2/1905  Hansen ................................. 405/99
3,693,356  9/1972  Mayo, Jr. et al. .................. 405/100

FOREIGN PATENT DOCUMENTS 264381  11/1967  Fed. Rep. of Germany ...... 405/100
1087343  2/1955  France ................................. 405/100

Primary Examiner—Philip R. Coe
Assistant Examiner—Joseph M. Pitko
Attorney, Agent, or Firm—Timothy R. Conrad

[57] ABSTRACT

A radial or taintor gate utilized to control the flow of water to a turbine is provided with an independently movable flap-gate which is operable to control the release of small incremental amounts of water to flow to the turbine as required, such as speed synchronization; the large radial gate can be maintained closed until such time as synchronization of the turbine has been achieved.

2 Claims, 3 Drawing Figures 4,394,098

RADIAL GATE HAVING FINE TUNING OF FLOW CONTROL

RELATED APPLICATIONS

This application is related to the following commonly assigned and co-pending U.S. patent applications: "Flap-Gate for Bottom Discharge Control in Canals Having Ice Problems," Ser. No. 203,536, filed Nov. 3, 1980, "Flap-Gate for Discharge Side of a Turbine Having No Wicket Gates," Ser. No. 203,113, filed Nov. 3, 1980 and "Self-Closing Flow Control Flap-Gate of a Turbine Having No Wicket Gates," Ser. No. 203,538, filed Nov. 3, 1980.

BACKGROUND

Radial or taintor gates cover relatively large flow areas. Thus, a relatively small opening movement of a radial gate passes a relatively large volume of water to flow through the opening. This is true because the control of the opening movement of a radial gate is extremely difficult. Thus, it is the usual practice of utilizing butterfly valves or other types of valves in conjunction with radial gates to control the flow of water passed through the radial gate to a turbine. These valves are costly to manufacture and install and also operate normally in a full open position or a full closed position. Thus, the valve size is critically related to the synchronous speed of the turbines.

SUMMARY OF THE INVENTION

To provide for fine control of water flow from a radial gate, an independent movable flap-gate has been conceived in operable association with the radial gate. The flap-gate controls a relatively small opening 16 formed in the water faceplate of the radial gate. This permits fine control of water flow through the radial gate so that the risk of too great a flow of water to a turbine which would drive the turbine at a higher speed than is required for synchronizing is eliminated.

DESCRIPTION OF THE INVENTION

Figure 1:
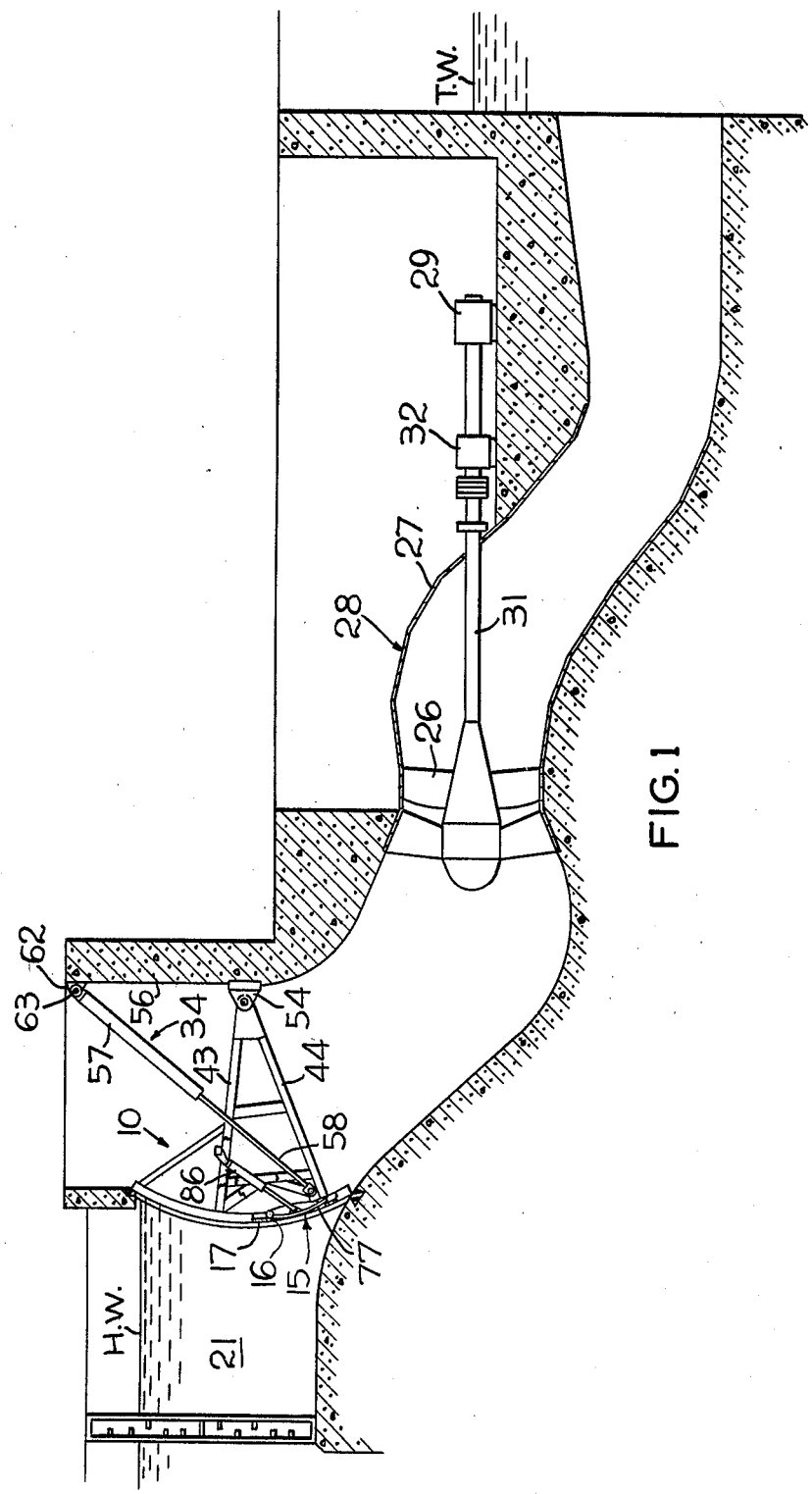
FIG. 1 is a general view in vertical section through a portion of a water canal in which a turbine generator unit and the invention is incorporated.
Figure 2:
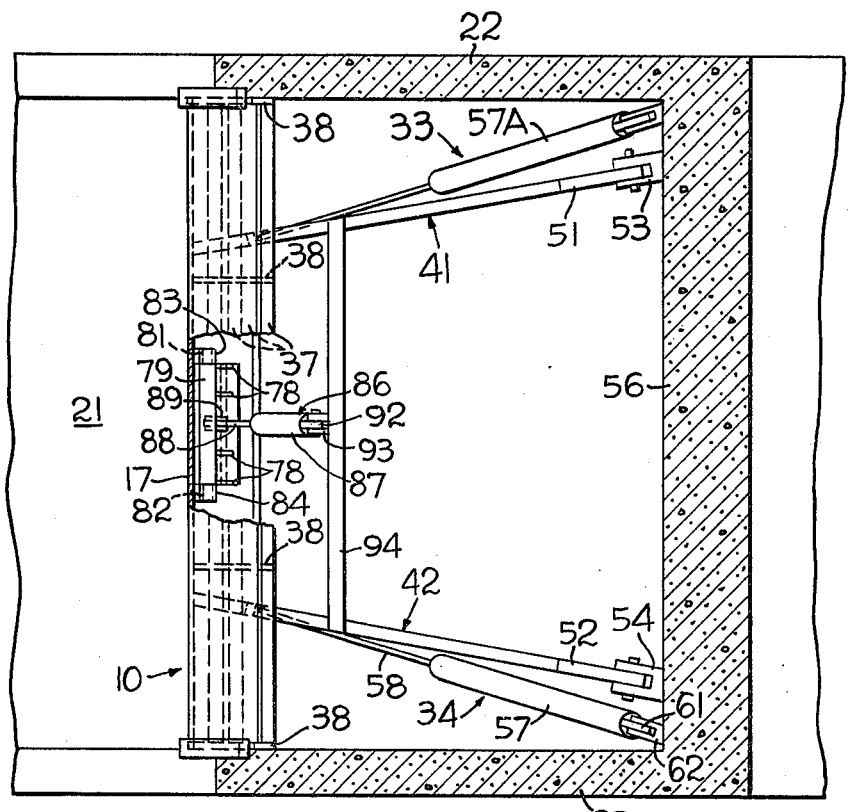
FIG. 2 is an enlarged plan view of the canal section showing the water flow control arrangement; and, FIG. 3 is a view partly in vertical section and partly in elevation showing the arrangement of FIG. 2.

As shown in FIG. 1 for illustrative purposes, a radial gate 10 is operably disposed within a canal 21 having spaced apart vertical sidewalls 22 and 23. The radial gate 10 controls water flow to a runner 26 within a fabricated draft tube assembly 27 of a tube unit 28. The tube unit 28 is disposed within the canal 21 and includes a generator 29 connected to be driven by the runner 26 via a drive shaft 31 through a speed increaser 32.

Opening and closing movement of the radial gate 10 is accomplished by means a pair of servomotors 33 and 34 supported on a vertical wall 56 bridging the canal walls 22 and 23 and connected to the radial gate 10.

The radial gate 10 includes the water faceplate 17 shaped as a portion of a cylinder with the convex surface thereof facing upstream. Faceplate 17 is relatively thin and thus is reinforced by a plurality of horizontal ribs 37 and vertical ribs 38. Support for the radial gate is provided by a pair of arm members 41 and 42. The arm members are similar and each include upper and lower angularly related beam members 43 and 44. A plurality of reinforcing beams 46 extend between the members 43 and 44. The forwardly or upstream ends of the beam members 43 and 44 are welded to the horizontal ribs 37. The downstream ends of the beam members 43 and 44 of each arm converge and are secured together by gusset plates 51 and 52, respectively. Each of the arm brackets are pivotally connected to associated brackets 53 and 54 that are secured to a transverse vertical wall 56.

Pivotal movement of the radial gate 10 within the canal 21 is effected by operation of the servomotors 33 and 34. As shown, the servomotors are identical and include a cylinder 57 in which a piston (not shown) is supported for reciprocal movement. A piston rod 58 movably axially by the piston has its extending end pivotally secured to a bracket 59 welded to the horizontal ribs 37 of the gate. The opposite or head end of the cylinder 57 is provided with a lug 61 which is received in a bifurcated bracket 62 and pivotally connected thereto by a pin 63. Thus, by pressurizing the cylinders 57 and 57A on the rod side of the pistons, the radial gate will be pivoted upwardly to permit water to flow from the head water under the gate to the turbine.

As previously mentioned, the radial gate 10 controls a relatively large flow area. Thus, a relatively small opening movement of the radial gate opens a relatively large cross-sectional area through which water from the head water will flow. This water flow is usually too large an amount of water to effect the desired start-up and synchronizing of the turbine 28. The radial gate is normally so wide and so cumbersome that its movement cannot be controlled very accurately. Thus, it has been the practice of utilizing butterfly valves or other types of valves to receive the water flow from the radial gate to release the desired amount of water for turbine start-up and synchronization. However, these valves are costly to manufacture and operate.

It is herein conceived to provide the radial gate 10 with the relatively small flap-gate 15 which is independently operable by its own actuator to any position between open and closed positions. Operation of the flap-gate 15 permits a controlled release of a relatively small amount of water so as to obtain the desired water flow to the turbine 28. The flap-gate 15 can be operated with the radial gate 10 in a closed position or at any open position of the radial gate. Thus, fine tuning of water flow through the radial gate can be obtained.

Figure 3:
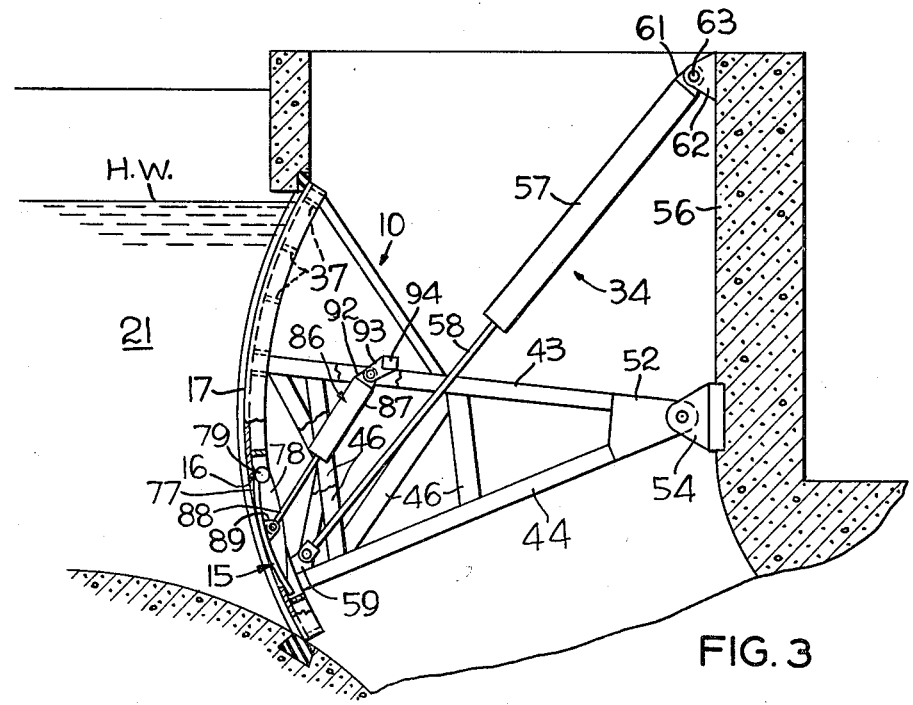

As shown, the flap-gate 15 is pivotally supported on the radial gate 10 in position to seal a rectangular opening 16 formed in the surface face 17 of the radial gate. The flap-gate 15 is constructed of steel having a smoothly contoured waterface plate 77 sized so as to seal the rectangular opening 16 in the radial gate. The backside of the plate 77 is reinforced by a plurality of ribs 78. The waterface plate 77 is welded to a rotatable elongated cylindrical body portion 79. Extending outwardly of the cylindrical body portion 79 are axially aligned shafts 81 and 82. The free ends of the shafts are journalled in bearings carried by supports 83 and 84 which are welded to the back surface of the waterface plate 17, as shown in FIG. 3.

Pivotal movement of the flap-gate independently of the movement of the radial gate is effected by a hydraulic motor 86 operatively connected to the flap-gate. To this end the hydraulic motor includes a cylinder 87 having a reciprocal piston (not shown) therein. A piston rod 88 movable axially by the reciprocal movement of the piston (not shown) within the cylinder has its extending end pivotally secured to a bracket 89 that is welded to the flap-gate. The opposite end of the cylinder 87 is provided with a tang 92 that is pivotally connected to a bifurcated bracket 93 welded to a cross beam 94 that extends between the two arms 41 and 42.

In operation, the radial gate can be moved to an open position where a certain amount of water flow under the gate is permitted. If the flow obtained is not sufficient for starting or synchronizing the turbine, the flap-gate will be opened to permit additional water flow through the gate. This movement will obtain untill synchronizing speed of the turbine is obtained. It is also contemplated that should the radial gate be provided with a plurality of flap-gates similar to gate 15, the radial gate could be maintained closed and the flap-gates opened as needed to obtain the desired water flow to the turbine.

It is apparent that in providing a radial gate with an independently operable flap-gate an effective means has been provided to fine tune water flow through a radial gate.

The embodiments of the invention in which an exclusive property or privilege is claimed are defined as follows:

1. An apparatus in operable combination with a hydraulic turbine for controlling a flow of water through a waterway in which said turbine, is located, comprising:

a radial gate within said waterway upstream of said turbine having a water face plate movable between a closed position for interrupting said flow of water through said waterway toward said turbine and a full open position permitting a generally uninhibited flow of water through said waterway toward said turbine;

means for moving said radial gate between said closed and full open position and operable to maintain said radial gate at preselected incremental open positions intermediate said closed and full open positions to permit a preselected incremental flow of water through said waterway toward said turbine;

a second gate carried by said radial gate and operable independent of the positioning of said radial gate to be selectively moved between a flow blocking position to a maximum open position with said second gate permitting a maximum supplemental flow of water through said waterway to said turbine when in said maximum open position and permitting generally no supplemental flow when in said blocking position; said water face plate of said radial gate having an opening therethrough operable to permit said maximum supplemental flow of water through said radial gate to said turbine and said second gate comprising a flap-gate having a water surface plate sized to completely cover said opening in said radial gate; said flap-gate being supported on said radial gate on a downstream surface thereof in said blocking position wherein said water surface plate covers said opening in said radial gate and movable from said blocking position to a maximum open position to permit said maximum supplemental flow of water through said opening toward said turbine; and means for selectively moving said second gate between said blocking and maximum open positions independent of the positioning of said first gate comprising a power operator operably connected to said flap-gate to move said flap-gate between said flap blocking and maximum open position;

whereby said radial gate is positionable to an intermediate open position permitting only a predetermined amount of water to flow to the turbine which is less than an amount necessary to drive the turbine to achieve a synchronization of the turbine and said flap-gate may be operated to permit a supplemental flow of water to the turbine to fine tune the water flow to achieve synchronization and thereafter said radial gate may be opened to permit full water flow to the turbine.

2. An apparatus according to claim 1, wherein said power operator is a fluid motor carried by said radial gate and operably connected to said water surface plate of said flap-gate to selectively move said water surface plate between said blocking and maximum open positions and operable to maintain said water surface plate at preselected incremental open positions intermediate said blocking and maximum open positions.

* * * * *